United States Patent
Shalev

(10) Patent No.: US 9,700,852 B2
(45) Date of Patent: Jul. 11, 2017

(54) SYSTEM, METHOD AND CAPSULES FOR PRODUCING SPARKLING DRINKS

(71) Applicant: SO SPARK LTD, Herzeliya (IL)

(72) Inventor: Pinchas Shalev, Herzeliya (IL)

(73) Assignee: SO SPARK LTD., Herzeliya (IL)

( * ) Notice: Subject to any disclaimer, the term of this patent is extended or adjusted under 35 U.S.C. 154(b) by 0 days.

(21) Appl. No.: 13/685,050

(22) Filed: Nov. 26, 2012

(65) Prior Publication Data

US 2014/0065266 A1    Mar. 6, 2014

Related U.S. Application Data

(60) Provisional application No. 61/693,820, filed on Aug. 28, 2012.

(51) Int. Cl.
*A47J 31/44* (2006.01)
*B01F 3/04* (2006.01)
(Continued)

(52) U.S. Cl.
CPC ............ *B01F 3/04787* (2013.01); *A23L 2/54* (2013.01); *A47J 31/407* (2013.01); *A47J 31/44* (2013.01);
(Continued)

(58) Field of Classification Search
CPC ......... A23L 2/54; A47J 31/44; A47J 31/4485; A47J 31/407; A47J 31/4403;
(Continued)

(56) References Cited

U.S. PATENT DOCUMENTS 3,855,397 A * 12/1974 Hoffman .................. C01D 7/18
                                                                    23/302 R
4,386,109 A    5/1983 Bowen
(Continued)

FOREIGN PATENT DOCUMENTS

EP    343 673 A1    11/1989
GB    323102    12/1929
(Continued)

OTHER PUBLICATIONS

"The chemical formula for sodium bicarbonate" obtained from https://answers.yahoo.com/question/index?qid=20080923132028, Date Sep. 23, 2008, pp. 2.*
(Continued)

*Primary Examiner* — Jyoti Chawla
(74) *Attorney, Agent, or Firm* — Pearl Cohen Zedek Latzer Baratz LLP

(57) ABSTRACT

A system and a method for the production and provision of $CO_2$ gas is disclosed. A sealable chamber is equipped with heating means and when sodium bicarbonate is placed in it and heated to its decomposition temperature $CO_2$ gas is released. The released gas is conveyed into liquid within a container and when the pressure of the gas in the container raises more and more $CO_2$ gas is dissolved. The heating may be done by conduction mechanism or by induction mechanism. The sodium bicarbonate or any other material including carbon dioxide may be disposed in powder or solid form. I may be disposed in thin envelope case.

11 Claims, 8 Drawing Sheets

(51) Int. Cl.
    *A23L 2/54*     (2006.01)
    *A47J 31/40*     (2006.01)
    *B65D 85/804*     (2006.01)

(52) U.S. Cl.
    CPC ........ *A47J 31/4403* (2013.01); *B65D 85/804* (2013.01); *A23V 2002/00* (2013.01); *B01F 2003/049* (2013.01); *B01F 2215/0022* (2013.01)

(58) Field of Classification Search
    CPC ........... A23V 2200/00; B01F 2003/049; B01F 2215/0022; B01F 3/04787; B65D 85/804
    USPC ......... 426/474, 477; 261/131, 138, 152, 156
    See application file for complete search history.

(56) References Cited

U.S. PATENT DOCUMENTS

| | | | |
|---|---|---|---|
| 4,636,337 | A | 1/1987 | Gupta |
| 5,021,219 | A | 6/1991 | Rudick |
| 5,182,084 | A * | 1/1993 | Plester ................ B01F 3/04787 261/DIG. 7 |
| 5,192,513 | A | 3/1993 | Stumphauzer |
| 5,350,587 | A | 9/1994 | Plester |
| 5,936,499 | A | 8/1999 | Eckels |
| 6,114,176 | A * | 9/2000 | Edgson .................... C12Q 1/58 435/12 |
| 6,205,769 | B1 | 3/2001 | Brandenburg et al. |
| 6,426,111 | B1 | 7/2002 | Hirsch |
| 2004/0022676 | A1 | 2/2004 | Hamilton et al. |
| 2005/0155325 | A1* | 7/2005 | Abercrombie et al. ........ 53/401 |
| 2006/0169725 | A1 | 8/2006 | Grill |
| 2006/0219739 | A1 | 10/2006 | Crisp, III et al. |
| 2007/0062115 | A1 | 3/2007 | Berry et al. |
| 2009/0057302 | A1 | 3/2009 | Ben-Shmuel |
| 2009/0069925 | A1 | 3/2009 | Dattolo et al. |
| 2011/0031208 | A1 | 2/2011 | Golden |
| 2011/0033854 | A1 | 2/2011 | Bilchinsky |
| 2011/0174156 | A1* | 7/2011 | Saunders et al. ................. 95/46 |
| 2011/0226343 | A1 | 9/2011 | Novak et al. |
| 2013/0129870 | A1 | 5/2013 | Novak et al. |
| 2014/0065266 | A1 | 3/2014 | Shalev |

FOREIGN PATENT DOCUMENTS

| | | | |
|---|---|---|---|
| GB | | 2477376 | 8/2011 |
| GB | | 2477376 A * | 8/2011 |
| JP | | 06-086978 | 3/1994 |
| RU | | 2300301 | 6/2007 |
| WO | WO 94/10860 | | 5/1994 |
| WO | WO 2007/096878 | | 8/2007 |
| WO | WO 2008/007368 | | 1/2008 |
| WO | WO 2009/104191 | | 8/2009 |
| WO | WO 2010/052724 | | 5/2010 |
| WO | WO 2011/094677 | | 8/2011 |
| WO | WO2011094677 | | 8/2011 |
| WO | WO 2012/076863 A2 | | 6/2012 |
| WO | WO2012076863 | | 6/2012 |
| WO | WO 2012/103112 | | 8/2012 |
| WO | WO 2013/070095 | | 5/2013 |
| WO | WO 2014/006510 | | 1/2014 |
| WO | WO 2014/033705 | | 3/2014 |

OTHER PUBLICATIONS

Applicant's arguments are directed to new claim 19 which has been addressed in the rejection above.*
Search Report of International Application No. PCT/2013/050699 mailed on Mar. 25, 2014.
International Search Report of Application No. PCT/IL2015/050094 mailed on Jul. 30, 2015.
Supplementary European Search Report of Application No. EP 13 83 3415 mailed on May 11, 2016.
Office Action of U.S. Appl. No. 14/65,170 mailed on Feb. 23, 2016.
Notice of allowance for U.S. Appl. No. 14/605,170 dated May 12, 2016.
Office Action for Russian Application No. 2015107427 mailed Jan. 27, 2017.
Spector, et al, How Do Microwaves Cook Food?, accessed online at: http://www.businessinsdier.com/how-do-microwaves-work-2014-6(June 10, 2014).
Office Action of U.S. Appl. No. 15/172,918 mailed on Apr. 7, 2017.
Office Action of Japanese Application No. 2015-529205 dated Mar. 14, 2017.
Chinese Office Action for CN Application No. 201380045615X dated Apr. 6, 2017.

* cited by examiner

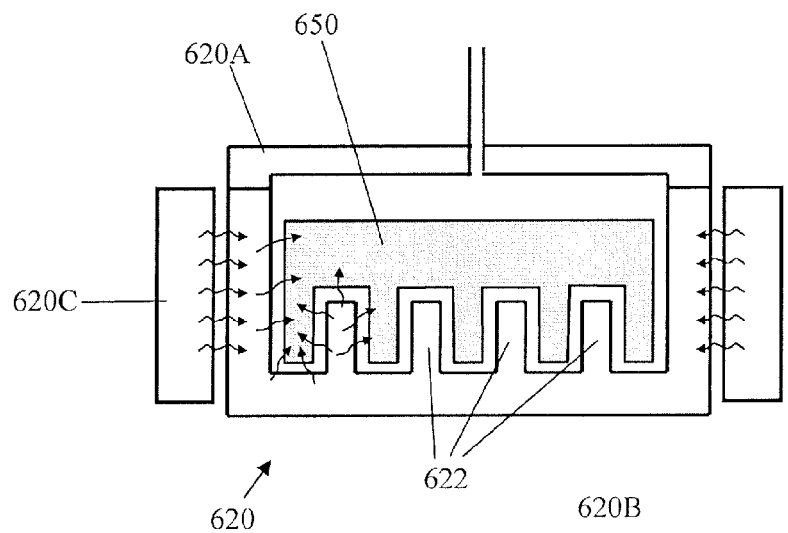
Fig. 6A
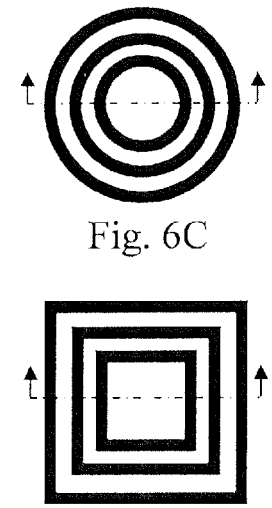
Fig. 6C
Fig. 6D
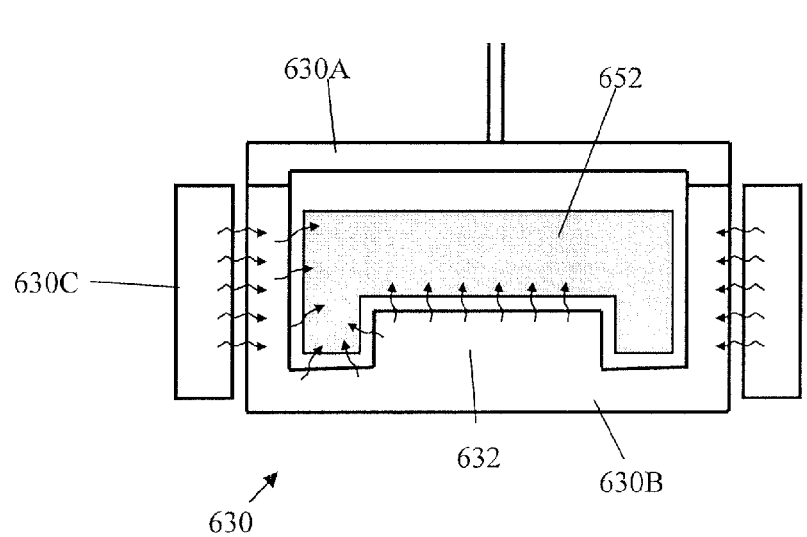
Fig. 6B
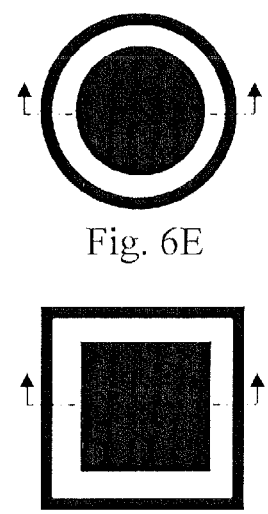
Fig. 6E
Fig. 6F

SYSTEM, METHOD AND CAPSULES FOR PRODUCING SPARKLING DRINKS

CROSS REFERENCE TO RELATED APPLICATIONS

This Application claims the benefit of U.S. Provisional Application Ser. No. 61/693,820, filed Aug. 28, 2012, and entitled "SYSTEM AND METHOD FOR PRODUCING SPARKLING DRINKS", which is hereby incorporated by reference in its entirety.

BACKGROUND OF THE INVENTION

Sparkling drinks are manufactured by dissolving carbon dioxide in liquid, typically by pressurizing the liquid with carbon dioxide. When pressure of the sparkling drink is low, bubbles of carbon dioxide may be formed and come out of the solution.

Carbon dioxide is typically provided as pressurized gas in pressurized tanks or cartridges. For example, Carbonated water may be made by rechargeable soda siphon, or a disposable carbon dioxide cartridge. The soda siphon may be filled with chilled water and carbon dioxide may be added under pressure. Sparkling drinks produced this way tend to be only slightly gassy.

Alternatively, carbonators or carbonation machines may be used. Carbonators range from home scale machines such as Sodastream™ to large scale carbonators. Carbonators pump water into a pressurized chamber where it is combined with $CO_2$ from pressurized tanks. The pressurized, carbonated water may be mixed with flavorings, typically in the form of syrups.

However, pressurized $CO_2$ tanks are expensive to manufacture and require careful handling. Transportation of the pressurized $CO_2$ tanks is complicated due to their high weight and high pressure. Also, it is not allowed to send pressurized $CO_2$ tanks by air in plains. In addition, refill of a pressurized $CO_2$ tank requires that the tank will be taken to a service site, which is a burden.

$CO_2$ may also be provided by chemical reaction of, for example, sodium bicarbonate and citric acid. However, this method is impractical since the chemical reaction results in other materials such as salts that may influence and degrade the taste of the drink. Separating the liquid from the salt is complicated and renders this approach impractical.

U.S. Pat. No. 5,182,084 to Plester discloses a portable carbonator which includes a built-in $CO_2$ supply system operated on disposable gas generating cartridges. $CO_2$ is generated by a chemical reaction between reagents which carbonates and/or propels the water. The system disclosed in U.S. Pat. No. 5,182,084 is meant to maintain a constant gaseous pressure whenever carbonated water is drawn. The carbonator disclosed in U.S. Pat. No. 5,182,084 is very complicated, involves a lot of mechanical elements, stationary and movable (dynamic), as depicted for example in FIG. 4.

U.S. Pat. No. 5,350,587 to Plester discloses a $CO_2$ gas generator which chemically generates the gas from a chemical reaction between two reagents contained within a common container. The generator aims to automatically provide gas so as to maintain the gas headspace pressure in constant reference to a reference pressure. While claiming to provide a device that is easy to use by non-professional users based on disposable gas generator units, in practice the device according to this patent, as may be seen for example in FIGS. 3A-3L, involves highly complicated mechanical elements including containers within containers, mechanical valves made to control the disposing of the gas and the releasing of the reagents, etc.

U.S. Pat. No. 4,636,337 to Gupta discloses device and method for dispensing gas $CO_2$ to carbonate water. The device and method employ gas generator using two chemically active reagents in the presence of water. The device teaches a bleed to maintain the pressure in the headspace at sufficiently high levels while allowing continuous flow of $CO_2$ through the carbonated liquid.

U.S. Pat. No. 5,192,513 to Stumphauzer discloses device and method for rapid carbonation of water using chemical reaction taking place in one pressure vessel, transferring the $CO_2$ to a second pressure vessel. One object of the disclosed device and method is to provide a simple, inexpensive and efficient process for rapidly generating $CO_2$ and carbonating water. However the apparatus, as disclosed for example in FIG. 1, is very complicated and includes a large number of parts, which drives it away from being simple.

U.S. Pat. No. 5,021,219 to Rudick discloses device and method for self regulating $CO_2$ gas generator for carbonating liquids. The gas generator consists of two liquid chambers for containing to liquid reagents that when chemically adjoined react and produce the gas. Here also the devices disclosed are complicated, include large number of parts and do not operate with disposable reagent packages.

GB Patent No. 323102 to Blaxter discloses carbonating apparatus pumping carbonated water together with carbon dioxide to a carbonating vessel which is also supplied with de-aerated water pumped into that vessel and to a mixing pump that provide the water and the carbon dioxide to a carbonating vessel.

International Patent Application Publication No. WO 94/10860 to Stumphauzer discloses device and method for rapid carbonation of liquids. The device consists of two vessels connected together in which gas is produced using carbon dioxide compound and water that when chemically reacting with the compound produces gas. The device is very bulky and involves large number of parts (valves, seals, springs, conduits and the like).

International Patent Application Publication No. WO 2011/094677 to Novak discloses system, method and cartridge for carbonating liquid. Carbon dioxide may be provided in a cartridge used to generate $CO_2$ gas to be dissolved into the liquid.

SUMMARY OF THE INVENTION

A device for providing carbon dioxide gas is disclosed, the device comprising a pressure-sealed pressure chamber adapted to be filled with substance that includes carbon dioxide, a gas conduit connected at its proximal end to said chamber to provide said gas from said chamber, heat energy unit to provide energy to heat said substance in said chamber and a safety pressure outlet to relief pressure from said chamber when said pressure exceeds predefined pressure level, wherein said chamber comprising a base element and a cap element, said base element and said cap element are adapted to keep pressure inside said chamber in closed position and to open and allow inserting and removing substance when in opened position. The method may further comprise activating circulating means to pump liquid from said bottle and to spray it back into the bottle. The method may be characterized so that the providing of heat is done by energizing electrical heater located around said chamber or by providing induction heating energy to the substance.

Also is disclosed a method for producing sparkling drinks, the method comprising providing pressure chamber and a pressure-sealable bottle-feeding pipe connectable to a bottle, attaching a bottle filled with liquid to the pressure-sealed bottle-feeding pipe in a pressure sealed manner, placing substance that includes carbon dioxide in the chamber, pressure sealing the chamber and providing heat to the substrate. The device may further comprise container cap disposed so that the conduit passes via the cap in a pressure-sealed manner, and the cap is disposed in a distance from the distal end of the conduit so as to ensure that when a container filled with liquid is adapted to and secured said container cap said distal end of said conduit is submerged in said liquid. The device may further comprise circulating means comprising that comprise circulating pump, inlet conduit connected to said pump at its inlet port and made to have its free end submerged in said liquid in said container when said container is attached to said device and filled with liquid and outlet conduit connected to said pump at its outlet port and made to spray liquid received from said pump in the headspace of said container.

Further is disclosed a capsule for producing gas in a device for providing carbon dioxide gas, the capsule comprising sodium bicarbonate in one of solid and powder form. The capsule may further comprise at least one additive form the list comprising: taste additive, flavor additive, color additive. The capsule may comprise, additionally or alternatively, chips of ferrous or other material with high magnetic permeability. The capsule may be encapsulated in a thin envelope of non-ferrous material, where the envelope has one or more punctures made in its wall to allow releasing of gas produced in the envelope.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIGS. 6A and 6B are cross section views of two forms of gas production units made across the middle of the gas production units, according to two embodiments of the present invention;

Figure 1:
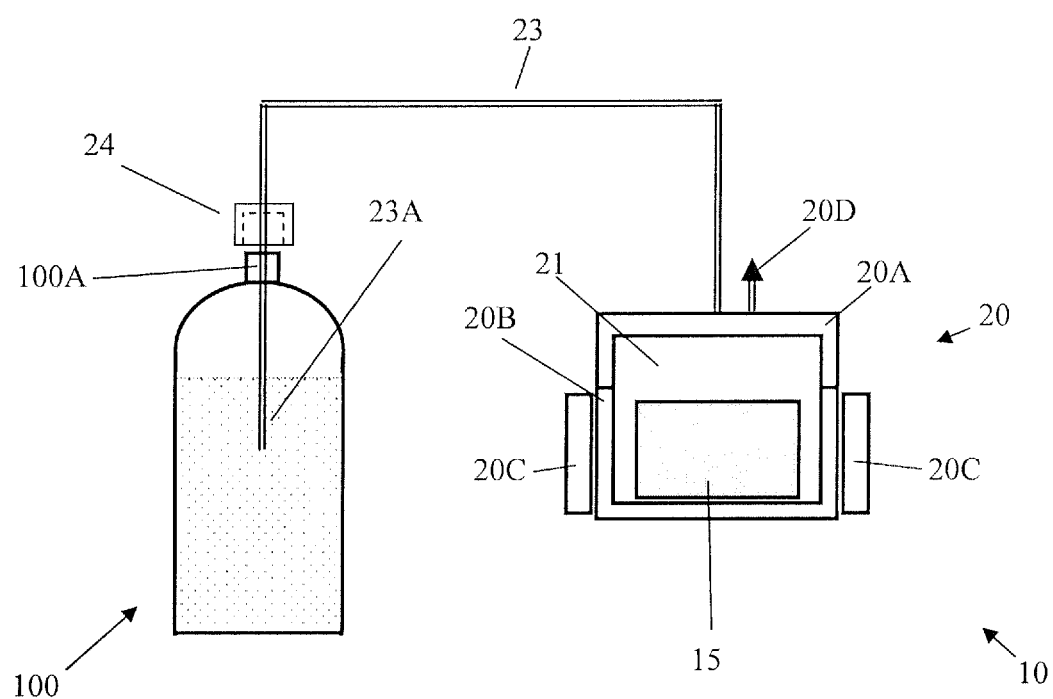
FIG. 1 is a schematic illustration of a carbonating system, according to embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Although embodiments of the present invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed at the same point in time.

Heating of compositions to a temperature that is higher than the thermal decomposition temperature of that composition, in order to decomposite it is well known. Similarly heating compositions to a temperature that is higher than the phase transition temperature, in order to cause the composition to undergo phase transition is well known. For example, heating a composition that includes $CO_2$ to a temperature that is higher than the thermal decomposition temperature may decomposite it and thus may cause the decomposed material to release $CO_2$. In many cases such process is known as calcination, or calcination reaction. For example, when limestone is calcinated the chemical reaction is expressed:

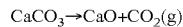

$$CaCO_3 \rightarrow CaO + CO_2(g)$$

That is, the calcination process decomposed the lime stone to lime (calcium oxide) and carbon dioxide. Well known examples of calcination processes, mostly held in large (industrial) scales are meant to remove certain undesired components from the composition. One example is decomposition of hydrated minerals, as in the calcination of bauxite and gypsum, to remove crystalline water. Another example is the decomposition of volatile matter contained in raw petroleum coke and yet another example is the removal of ammonium ions in the synthesis of zeolites. Thus, well known use of decomposition by heating is to remove and get rid of undesired one or more components in a composition.

Many devices and methods for carbonating liquids are known. Some require complicated and bulky apparatuses and multi stage methods, even for the production of carbonated beverage for personal use. Several known devices and methods disclose the use of pairs of reagents that when chemically activated release carbon dioxide that may be used for the carbonation of the liquid, to create gaseous beverage. Other devices and methods make use of pre-pressurized $CO_2$ that is contained in high pressure containers from which the pressurized $CO_2$ may be released into a container holding the beverage in order to carbonate it. Use of pairs of reagents for the production of $CO_2$ requires means for keeping the reagents apart from each other until the chemical reaction takes place and in many devices known in the art complicated and bulky carbonating apparatuses are required in order to control the process of the carbonation. Use of pressurized $CO_2$ containers is typically less complicated then the use of carbonating devices based on chemical reaction of pairs of reagents, however handling the containers of the pressurized $CO_2$ is typically inconvenient and—with non-disposable containers there is the burden of carrying the filled containers from the store and the empty ones back there.

The inventor of the invention embodiments of which are described herein below has discovered that the amount of $CO_2$ that may be released from a relatively small amount of sodium bicarbonate during calcination process is relatively very large. For example, from a tablet of sodium bicarbonate weighing 35 grams, when calcinated at temperatures of about 60-200 degrees centigrade $CO_2$ is released in amount that is enough to carbonate water or similar liquid in the amount of 1.5 liter having liquid pressure of 30 psi and temperature of 15 degrees. This ratio of $CO_2$ production is very high compared to other known methods. This allows to produce, at the desire of a user, amount of $CO_2$ that is enough for a 1 liter container from a sodium bicarbonate tablet weighing about 25 g.

Heating of materials such as sodium bicarbonate (NaHCO3) or other substances that include Carbon dioxide ($CO_2$), herein after referred to as $CO_2$ carrier, may release $CO_2$ gas. For example, when heating sodium bicarbonate in solid form in a closed vessel to temperature higher than the decomposition temperature the following applies:

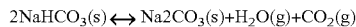

$$2NaHCO_3(s) \leftrightarrow Na2CO_3(s)+H_2O(g)+CO_2(g)$$

According to embodiments of the present invention, sparkling drinks, also referred to as carbonated drinks, may be produced by heating $CO_2$ carrier and by dissolving the released $CO_2$ gas in water or other liquid such as juice or wine.

At temperatures above 70° C. (degrees Celsius) sodium bicarbonate gradually decomposes into sodium carbonate, water and carbon dioxide. The conversion is fast at 200° C. For example, heating 8 grams of sodium bicarbonate at 180 degrees Celsius may produce 1.5 liters of $CO_2$ gas. To reach high carbonation level of commercial sparkling drinks, 3 to 4 liters of gas are needed for each 2 liters of liquid. Therefore, heating of about 16-25 grams of sodium bicarbonate may produce enough gas for 2 liters of sparkling drink.

Reference is made now to FIG. 1, which is a schematic illustration of carbonating system 10, according to embodiments of the present invention. System 10 may comprise $CO_2$ production unit 20 which is connected via gas conduit 23 and through gas disposing plug 24 to gas disposing port 23A. Gas production unit 20 may comprise a gas production base element 20B, gas production cap element 20A, heat energy supply unit 20C and pressure safety valve 20D. Base element 20B and cap element 20A are designed to form a pressure tight chamber 21 having two outlets. First outlet is the connection to gas conduit 23. This outlet is used for providing pressurized $CO_2$ when system 10 in use for carbonating. A second outlet is possible via safety valve 20D, when the pressure inside chamber 21 is higher than a predefined value. Gas conduit 23 may have, close to its distal end, gas disposing plug 24 that may be adapted to tightly and securely attach a container, such as liquid container 100, and gas disposing port 23A adapted to be submerged in the liquid in container 100, in order to provide $CO_2$ to it. Chamber 21 is designed to accommodate certain amount of $CO_2$ carrier material, for example in the form of a tablet (or capsule), such as tablet 15. When chamber 21 contains $CO_2$ carrier material, such as sodium bicarbonate and is tightly closed, the carrier material may be heated by heat energy supply unit 20C when energized by electrical energy. When the temperature of carrier material 15 reaches decomposition values heat energy supply unit 20C may be released and when its pressure climbs high enough (higher than the idle pressure in conduit 23 and container 100) $CO_2$ starts flowing into container 100 and carbonation of the liquid in container 100 begins. The rate of $CO_2$ production and supply may be controlled, for example, by the control of the temperature of the decomposition.

Figure 2:
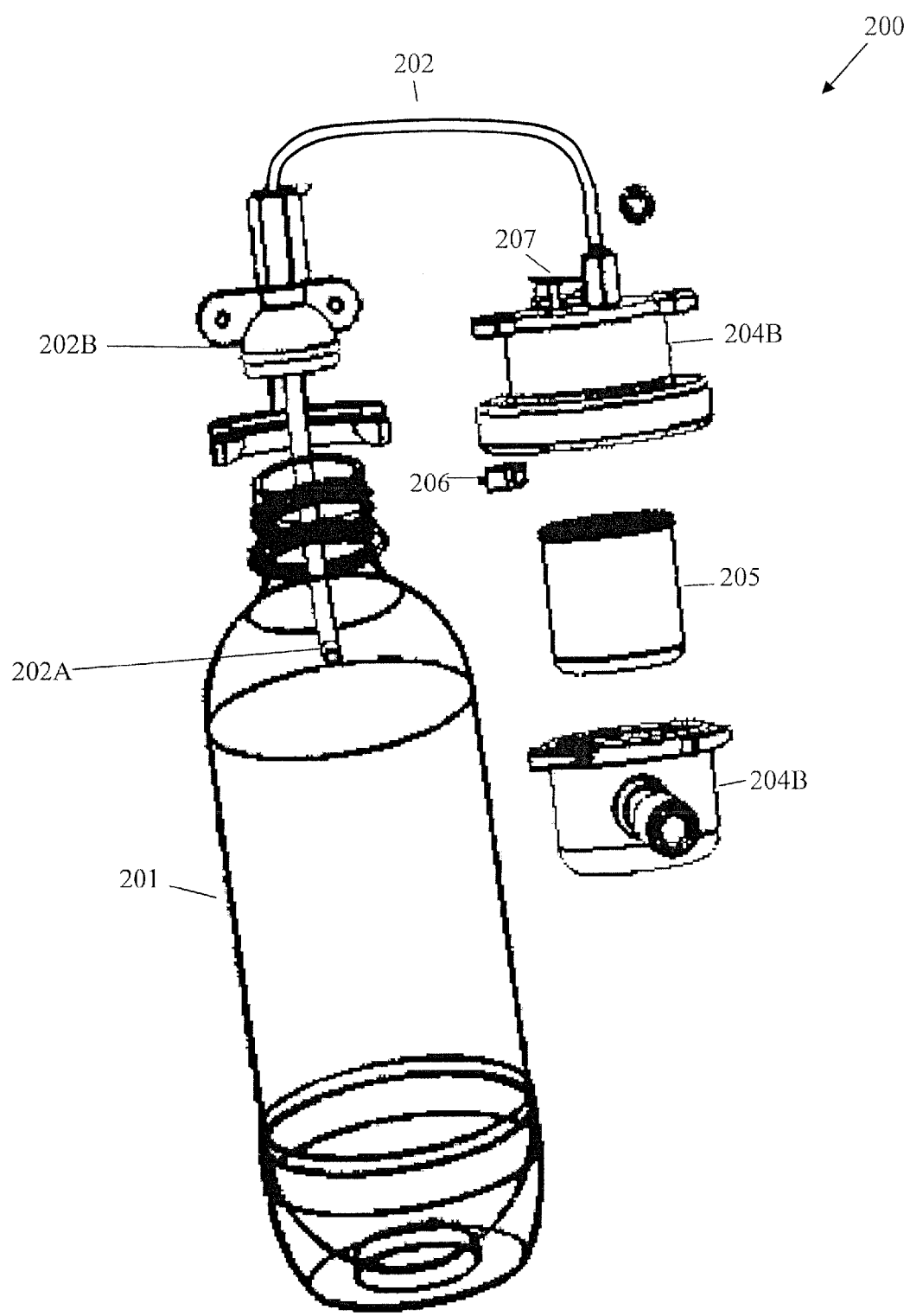
FIG. 2 is a schematic illustration of a system for providing pressurized gas for the production of sparkling drinks according to embodiments of the present invention.

Reference is made to FIG. 2 which is a schematic illustration of system 200 for providing pressurized gas for the production of sparkling drinks according to embodiments of the present invention. According to embodiments of the present invention, system 200 may include high pressure chamber 204 comprising chamber cap element 204A and chamber base element 204B. Pressure chamber 204 is connectable to liquid container (or bottle) 201 through pressure-sealed bottle-feeding pipe 202. Pipe 202 may connect to chamber 204 at one end and to bottle 201, through pipe outlet 202B, at the other end. Pipe outlet 202B may be inserted to bottle 1, and bottle cap 202A may be assembled onto pipe 202 to enable sealing the connection of pipe 202 to bottle 201. $CO_2$ carrier material unit 205 may be placed in chamber 204 before its cap element 204A and base element 204B are tightly closed to each other. System 200 may also include heating device 207 for heating pressure chamber 204 and its carrier material unit 205 contained in it. When it. When pressure chamber 204 is closed and heated, $CO_2$ carrier material unit 205 inside pressure chamber 204 is heated, and $CO_2$ gas is released into pressure chamber 204. The released gas may flow from pressure chamber 204 into bottle 201 through pipe 202, bottle cap 202A and pipe outlet 202B. When at work system 200 may be under pressure of 20-150 psi, or higher. Hence bottle cap 202A and pipe outlet 202B forming the connection of system 200 to bottle 201 should sustain the pressure levels of system 200 and be pressure-sealed at these pressure levels, and so should be pressure chamber 204, bottle 201, and pipe 202.

System 200 may include a temperature regulator 206 that may include a temperature sensor to measure the temperature inside chamber 204 and provide feedback to heating device 207 so as to regulate the temperature to be, for example, between 150 to 400 degrees Celsius.

$CO_2$ carrier material unit 205 may be provided in any suitable form such as powder, tablet, capsule etc. $CO_2$ carrier material unit 205 may be mixed or otherwise provided with various other flavoring materials that may be released as gas and mix with the drink. For example, a tablet may include a layer of sodium bicarbonate and a plurality of layers of additives.

Figure 3:
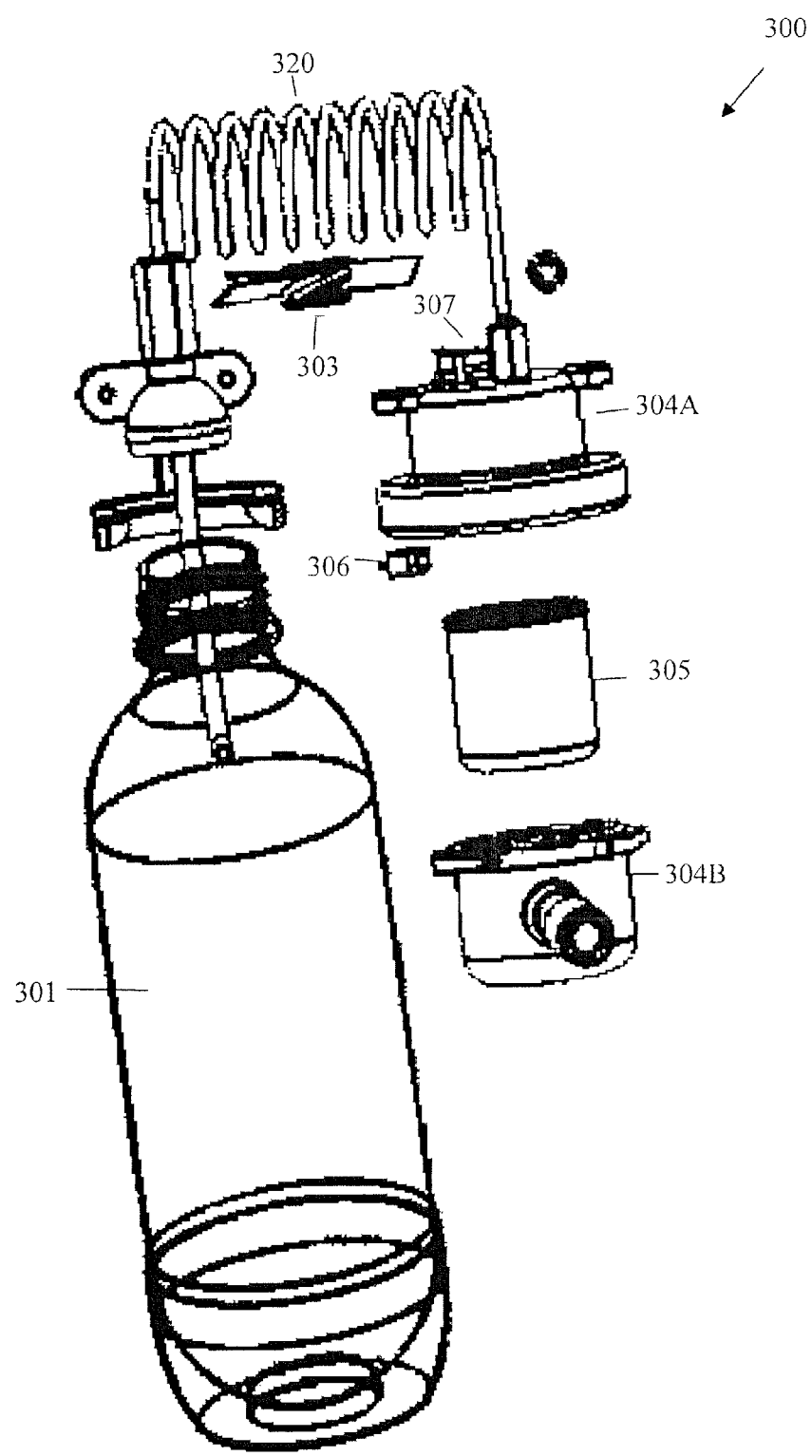
FIG. 3 is a schematic illustration of a system for providing gas for the production of sparkling drinks according to embodiments of the present invention.

Reference is now made to FIG. 3 which is a schematic illustration of system 300 for providing gas for the production of sparkling drinks according to embodiments of the present invention. System 300 may be very much similar to system 200 of FIG. 2, however it may further comprise a fan 303 to cool the gas flowing in pipe 320 which may be, for example, spiral shaped to enable more efficient cooling of the produced gas.

Figure 4:
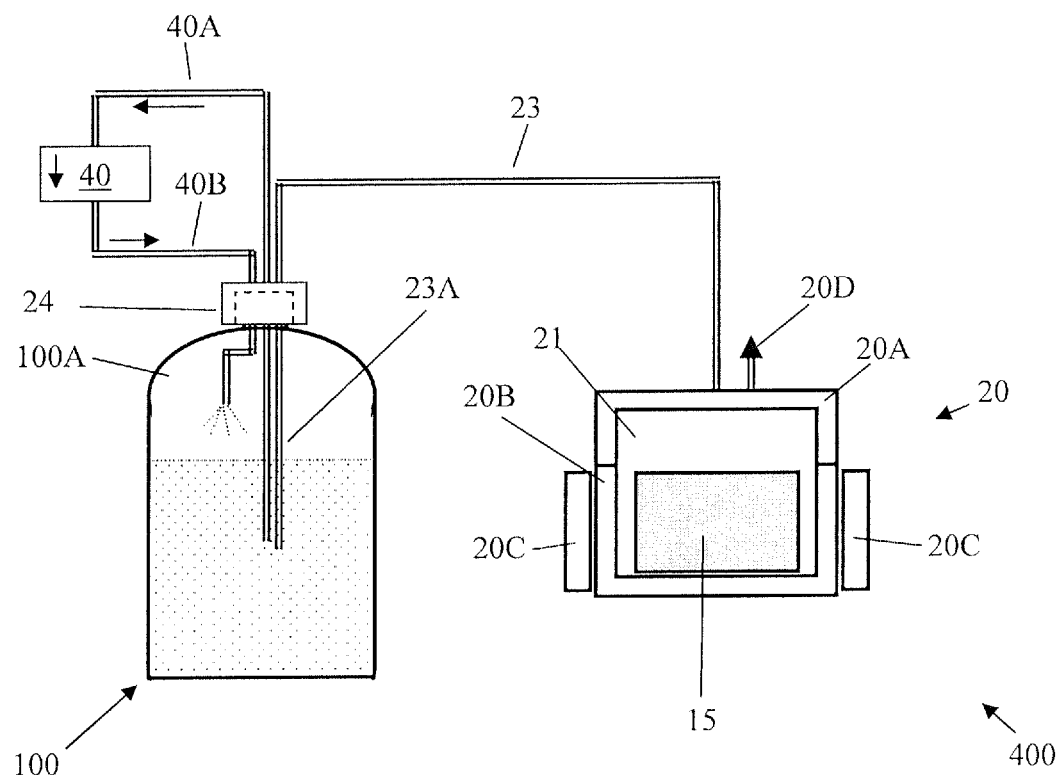
FIG. 4 is schematic illustration of a system for providing gas for the production of sparkling drinks according to embodiments of the present invention.

Reference is made now to FIG. 4, which is schematic illustration of system 400 for providing gas for the production of sparkling drinks according to embodiments of the present invention. System 400 may comprise $CO_2$ production unit 20 which is connected via gas conduit 23 and through gas disposing plug 24 to gas disposing port 23A. Gas production unit 20 may comprise a gas production base element 20B, gas production cap element 20A, heat energy supply unit 20C and pressure safety valve 20D. Base element 20B and cap element 20A are designed to form a pressure tight chamber 21 having two outlets. First outlet is the connection to gas conduit 23. This outlet is used for providing pressurized $CO_2$ when system 400 is in use for carbonating. A second outlet is enabled via safety valve 20D, when the pressure inside chamber 21 is higher than a predefined value. Gas conduit 23 may have, close to its distal end, gas disposing plug 24 that may be adapted to tightly attach a container, such as liquid container 100, and gas disposing port 23A adapted to be submerged in the liquid in container 100, in order to provide $CO_2$ to it. Chamber 21 may be designed and may function similarly to chamber 21 described with respect to FIG. 1.

System 400 may further comprise circulation means 40, such as a pump, that is adapted to pump liquid from container 100 via conduit 40A, the distal end of which is adapted to be submerged in the liquid in container 100 and to return that liquid via conduit 40B into container 100. According to one embodiment conduits 40A and 40B may pass via disposing plug 24, however other embodiments may be utilized. The end of conduit 40B that is distal from circulation means 40 may be in a distance from plug 24 that will ensure that it will remain out of the liquid in container 100 when container 100 is substantially in upright position. The liquid that is returned via conduit 40B may be sprayed into the headspace of container 100, for example by forming the distal end of conduit 40B to provide liquid in the form of a spray. Circulation caused by the operation of circulation means 40 may improve (i.e. expend the amount of $CO_2$ gas dissolved in the container) and speed up the dissolving of $CO_2$ in the liquid. The inventor of the invention described in this application has discovered that when system 400 is in pressure equilibrium with the pressure inside container 100, after certain amount of gas was dissolved, the activation of circulation means 40 so that carbonated liquid is pumped from container 100 and sprayed back to its headspace enhances the rate of dissolving the gas in the liquid so that the pressure inside container 100 drops, due to the additional gas that was dissolved in the liquid and therefore the pressure produced by $CO_2$ production unit 20 is now higher than that inside container 100, and therefore additional amount of gas is provided to container 100. Thus, circulation means 40 may be activated continuously or periodically during the production of gas by gas production unit 20 to enable dissolving of larger amounts of gas in the liquid. An acidity indicator that was placed in container 100 indicated repeating raise of acidity of the liquid in container 100 as the activation of circulation means continued, which indicates that the amount of $CO_2$ gas in container 100 grew with the activation of circulation means 40.

Figure 5:
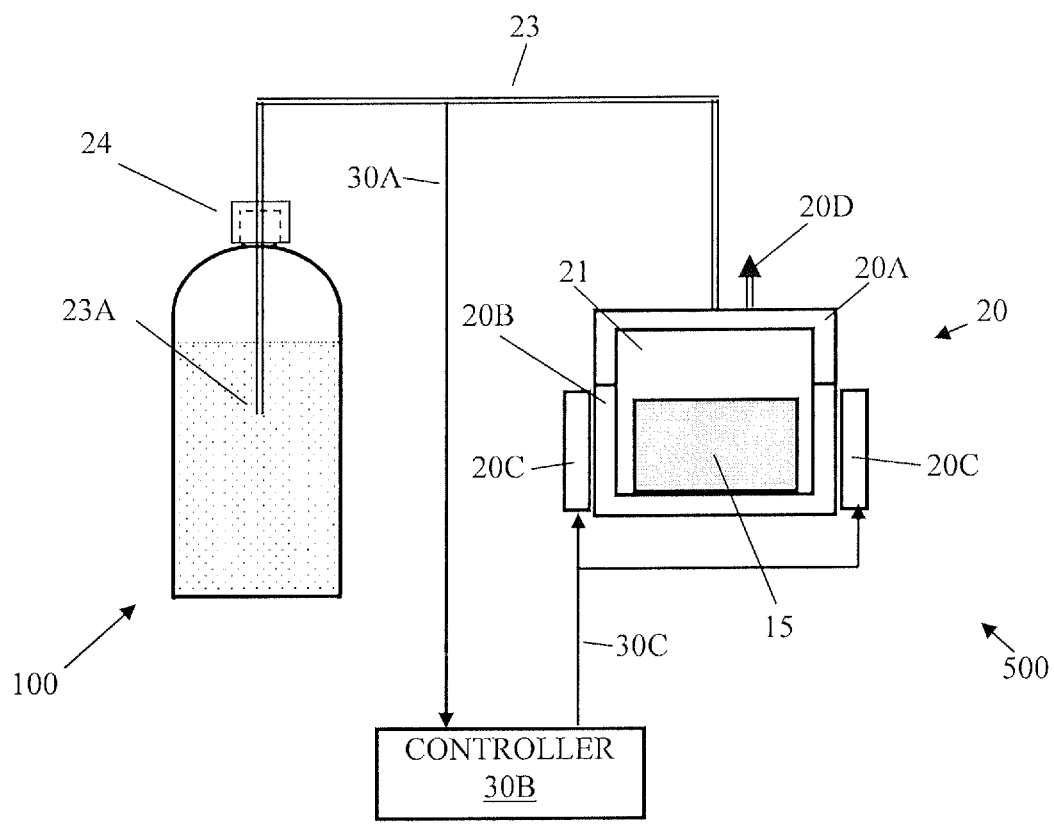
FIG. 5 is schematic illustration of a system for providing gas for the production of sparkling drinks according to embodiments of the present invention.

Reference is made now to FIG. 5, which is schematic illustration of system 500 for providing gas for the production of sparkling drinks according to embodiments of the present invention. Chamber 20, conduit 23, plug 24 and gas disposing port 23A are built and may function very much like their respective elements in the embodiment of FIG. 1. System 500 may further comprise pressure control unit 30, comprising pressure transmitter/gauge reading 30A, pressure control unit 30B and heat control line 30C. The pressure of the produced gas may be measured in the gas conduit 23 or in similar location. The gas pressure indication may be provided pressure control unit 30B. Pressure control unit may be acting as a simple ON/OFF unit that may turn off heat energy supply unit 20C when the measured gas pressure exceeds a first predefined value and resume heating when that pressure falls below a second predefined pressure value. In other embodiments control unit 30B may perform more complicated control functions, such a combination of one or more of proportional, derivative and integral (PID) of the difference between the measured pressure and a reference value. Other control functions may also be utilized, to achieve faster response, more accurate resulting pressure, and the like. It will be apparent to one skilled in the art that the amount of heat transferred to the active material, such as tablet 15 of FIGS. 1, 4 and 5 or tablet 205 of FIGS. 2 and 3, has an effect on the total amount and rate of release of produced gas, so that when the amount of heat provided causes tablet 15 or tablet 205 to reach temperature that is higher than the decomposition temperature gas will begin to release and temperature higher than that will increase the rate of release.

Heat may be transferred to tablets, according to embodiments of the present invention, in one or more from a list various heating methods. Reference is made now to FIGS. 6A and 6B, which are cross section side views of two different forms of gas production units 620 and 630, respectively, made across the middle of the gas production units, and to FIGS. 6C, 6D and 6E, 6F which are optional top views of same, according to two embodiments of the present invention. Gas production units 620 and 630 are designed to transfer heat to respective tablets 650 and 652 in heat conduction mechanism. Heat is produced in heat energy supply unit 620C, 630C, which may be formed as heat generators (e.g. on or more electrical heater elements) and is conducted to tablets 650, 652 via heating chamber base unit 620B, 630B. In order to enable high heat conduction capacity the size of surface area that interfaces with tablets 650, 652 the inner bottom face of base unit 520B, 520B, 630B is made with heat fins protruding from the bottom towards the inside of chamber 620, 630 respectively. These protrusions form heat fins 622, 632 respectively which in views perpendicular to the plane of view of FIGS. 6A, 6B may have the form as depicted in FIGS. 6C/6D or FIGS. 6E/6F respectively, in which the protruding fins are described by the thick black lines. Tablets 650, 652 will then be formed respectively with recesses to fit loosely to their respective fins 622, 632.

Figure 7:
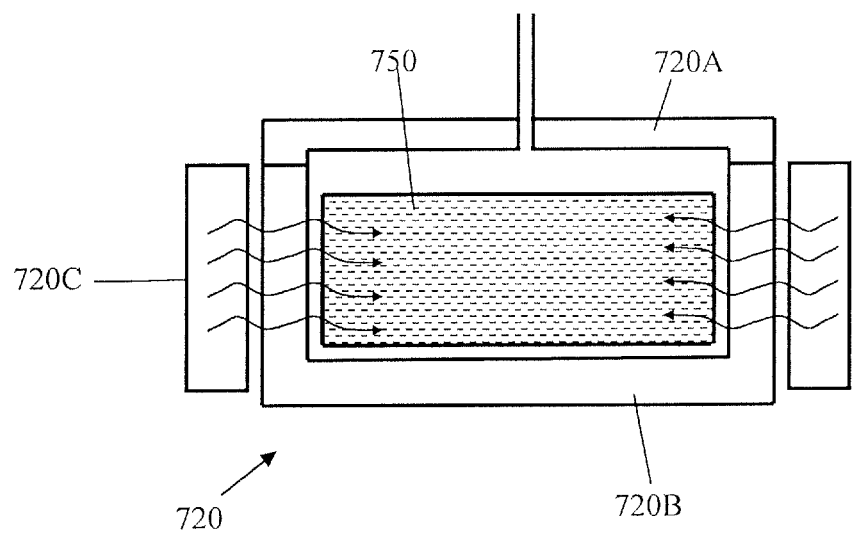
FIG. 7 is a cross section view of a gas production unit made across the middle of the gas production unit, according to embodiments of the present invention.

Heat may be produced, according to embodiments of the present invention, inside the tablet in the gas production unit, using induction heating mechanism. Reference is made now to FIG. 7, which is a cross section view of gas production unit 720 made across the middle of the gas production unit, according to embodiments of the present invention. In this embodiment heat energy supply unit 720C of gas generating unit 720 is formed as an induction AC electromagnetic generator, as is known in the art for induction heating. Tablet 750 includes, spread substantially evenly inside it, iron or ferrous alloys chips. According to some embodiments these chips may be made of other material having high magnetic permeability. When heat energy supply unit 720C is energized the electromagnetic energy invokes heating of the iron/ferrous chips inside tablet 750, which in turn heats the active material of the tablet. In experiments carried out by the inventor of the current invention it was observed that power supplied to heat energy supply unit 720C was equal to power supplied to heater working in heat conduction mechanism yet the heating of the tablet having same amount of sodium bicarbonate resulted heating to same temperature within time that was shorter compared with heat conduction mechanism, and the amount of produced $CO_2$ gas was larger compared than the gas produced using heat conduction mechanism.

Tablets made for use with induction heating may comprise certain amount of ferrous chips calculated to provide enough heating within defined period of time. According to another embodiment the heat generating material may be carbon chips. The size, spherical density and the level of unity of dispersion of the chips in the tablet may be selected to achieve the required level of heating and the time required for that heating. According to some embodiments tablets for the production of $CO_2$ gas may further comprise taste additives, flavor additives, color additives, and the like.

In experiments carried out by the inventor of the present invention he discovered that when heating the tablet using induction mechanism the rate of decomposition of the tablet and the rate of gas production may be kept same as in conduction heating with lower temperatures of the heating chamber.

Heating chamber units 720A and 720B may be made of non-ferrous metals which will minimize its heating when electromagnetic energy is activated.

Figure 8:
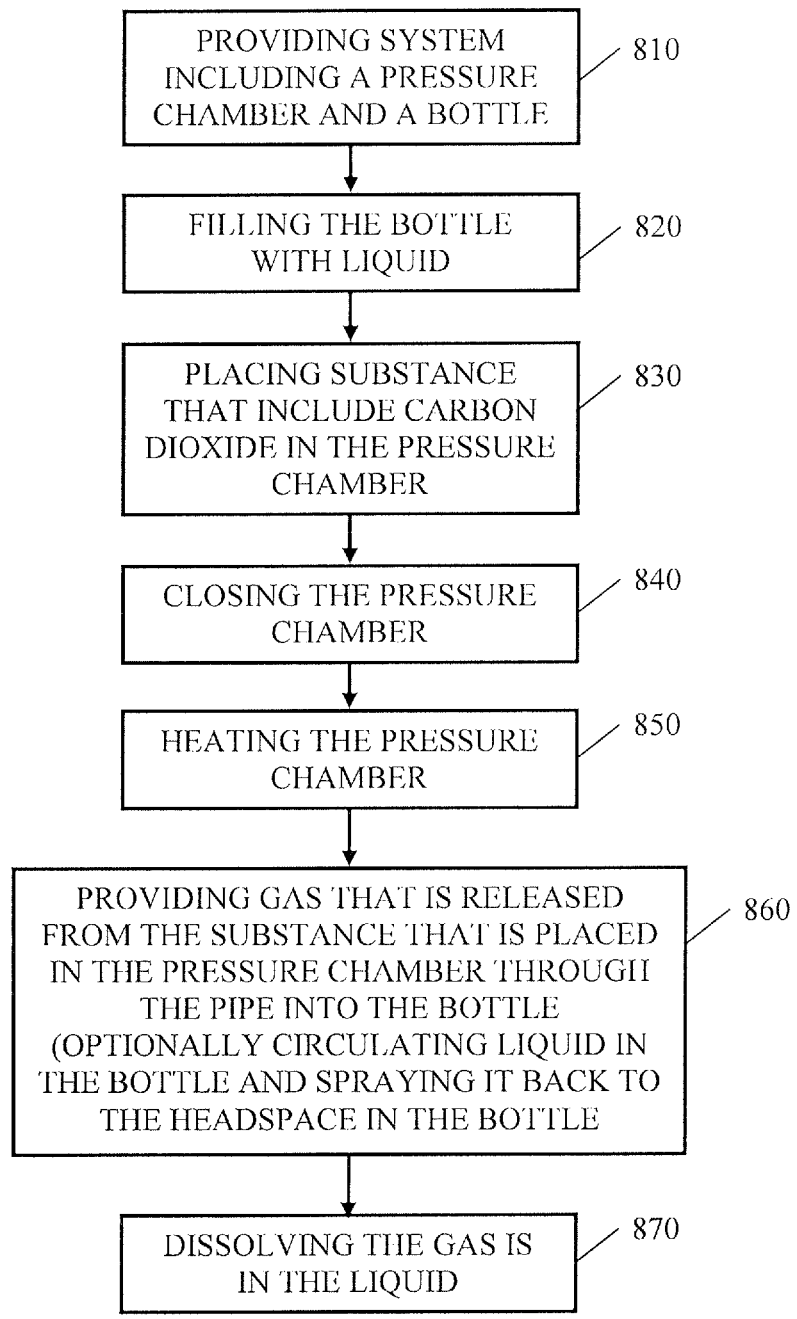
FIG. 8 is a flowchart illustration of a method for providing gas, such as $CO_2$, for the production of, for example, sparkling drinks, according to embodiments of the present invention.

Reference is now made to FIG. 8, which is a flowchart illustration of a method for providing gas, such as $CO_2$, for the production of for example, sparkling drinks, according to embodiments of the present invention. In block 810 a system including a pressure chamber and a pressure-sealed bottle-feeding pipe connectable to a bottle is provided. In block 820 the bottle is filled with liquid and is attached to the system in a pressure sealed manner. In block 830 $CO_2$ carrier such as sodium bicarbonate or other substance that includes carbon dioxide is placed in the pressure chamber. In block 840 the pressure chamber is pressure sealed and in block 850 the pressure chamber is heated. In block 860 the $CO_2$ gas that is released from the carrier (that is placed in the pressure chamber) flows through the pipe into the bottle. Optionally circulating means may be activated to pump liquid from the container and spray them back to the headspace in the container. The gas is then dissolved in the liquid found in the bottle in block 870 to create sparkling drink.

While embodiments of the present invention were described with relation to preparation of sparkling drinks, embodiments of the present invention are not limited to this application. Carbonated liquids may be produced according to embodiments of the present invention for any other suitable application in which carbonated liquids are required.

The invention claimed is:

1. A device for providing carbon dioxide gas, the device comprising:
   a pressure-sealed pressure chamber adapted to be filled with substantially dry sodium bicarbonate powder;
   a gas conduit connected at its proximal end to said chamber to provide said carbon dioxide gas from said chamber; and
   heat energy unit to provide energy to heat substantially dry sodium bicarbonate powder in said chamber to a temperature in the range of 150-400 degrees Celsius to release carbon dioxide from said sodium bicarbonate;
   wherein said chamber comprising a base element and a cap element, said base element and said cap element are adapted to keep pressure inside said chamber in closed position and to open and allow inserting and removing substance when in opened position.

2. The device of claim 1 further comprising container cap disposed so that said conduit passes via said cap in a pressure-sealed manner, said cap is disposed in a distance from the distal end of said conduit so as to ensure that when a container filled with liquid is adapted to and secured said container cap said distal end of said conduit is submerged in said liquid.

3. The device of claim 2 further comprising circulating means comprising:
   circulating pump;
   inlet conduit connected to said pump at its inlet port and made to have its free end submerged in said liquid in said container when said container is attached to said device and filled with liquid; and
   outlet conduit connected to said pump at its outlet port and made to spray liquid received from said pump in the headspace of said container.

4. The device of claim 2 wherein said base element is formed with heating fins protruding from the inner face of the element.

5. The device of claim 2 wherein said heat energy unit comprising one or more electrical heating elements to provide heat to said substantially dry sodium bicarbonate powder.

6. The device of claim 2 wherein said heat energy unit comprising electromagnetic element to provide electromagnetic energy to said substantially dry sodium bicarbonate powder by induction heating mechanism.

7. The device of claim 2 further comprising pressure control unit comprising;
   heat control unit;
   pressure indicator to provide indication of the pressure in said pressure conduit; and
   temperature control signal provided by said pressure control unit to said heat energy unit, to control said pressure by said heat energy unit.

8. The device of claim 2 wherein said gas conduit is shaped as a cooling element, further comprising:
   cooling fan adapted to flow air on said cooling element shaped conduit.

9. The device of claim 1, further comprising a safety pressure outlet to relieve pressure from said chamber when said pressure exceeds a predefined pressure level.

10. The device of claim 1, further comprising a sensor to provide feedback to the heat energy unit so as to regulate the temperature in the chamber.

11. The device of claim 1 wherein the substantially dry powder is in a tablet form.

* * * * *